(12) United States Patent
Uozumi et al.

(10) Patent No.: US 8,642,695 B2
(45) Date of Patent: Feb. 4, 2014

(54) NON-AQUEOUS PIGMENT INK

(75) Inventors: Shunsuke Uozumi, Inashiki-gun (JP); Ayako Mochizuki, Inashiki-gun (JP)

(73) Assignee: Riso Kagaku Corporation, Tokyo (JP)

( * ) Notice: Subject to any disclaimer, the term of this patent is extended or adjusted under 35 U.S.C. 154(b) by 853 days.

(21) Appl. No.: 12/314,429

(22) Filed: Dec. 10, 2008

(65) Prior Publication Data

US 2009/0155547 A1    Jun. 18, 2009

(30) Foreign Application Priority Data

Dec. 18, 2007  (JP) ................................. 2007-325670

(51) Int. Cl.
*C08L 37/00* (2006.01)

(52) U.S. Cl.
USPC ........... 524/548; 523/160; 523/161; 524/474; 524/476; 524/484; 524/490; 524/555; 524/556; 526/312

(58) Field of Classification Search
USPC .......... 523/160, 161; 524/474, 476, 484, 490, 524/548, 555, 556; 526/312
See application file for complete search history.

(56) References Cited

U.S. PATENT DOCUMENTS

| | | | | |
|---|---|---|---|---|
| 3,701,746 A | * | 10/1972 | Johnson et al. | 524/296 |
| 4,764,447 A | * | 8/1988 | Tsubuko et al. | 430/115 |
| 2002/0058730 A1 | * | 5/2002 | Kawashima et al. | 523/160 |
| 2008/0011192 A1 | * | 1/2008 | Uozumi et al. | 106/31.75 |

FOREIGN PATENT DOCUMENTS

| | | |
|---|---|---|
| JP | 62-018410 A | 1/1987 |
| JP | 09-151342 | 6/1997 |
| JP | 11-012528 A | 1/1999 |
| JP | 11-140343 | 5/1999 |
| JP | 2000-204281 A | 7/2000 |
| JP | 2007-197500 A | 8/2007 |

OTHER PUBLICATIONS

Office Action issued on Oct. 16, 2012, in the counterpart Japanese application, one (1) page.

* cited by examiner

*Primary Examiner* — James J Seidleck
*Assistant Examiner* — Marie Reddick
(74) *Attorney, Agent, or Firm* — Nath, Goldberg & Meyer; Joshua B. Goldberg

(57) ABSTRACT

A non-aqueous pigment ink comprising a pigment, a pigment dispersant and a non-aqueous solvent, wherein the pigment dispersant is an acrylic polymer comprising, as constituent monomers, (M1) an alkyl(meth)acrylate having an alkyl group of 12 or more carbon atoms, (M2) a (meth)acrylic acid derivative having an amino group, and (M3) a (meth)acrylic acid derivative having a glycidyl group, in which the combination of all the constituent monomers comprises from 7 to 15 mol % of the monomer (M2) and from 0.5 to 3 mol % of the monomer (M3) and the molar ratio (M2)/(M3) between the monomer (M2) and the monomer (M3) is within a range from 4 to 20.

3 Claims, No Drawings

NON-AQUEOUS PIGMENT INK

CROSS REFERENCE TO RELATED APPLICATIONS

This Application is based upon and claims the benefit of priority from prior Japanese Patent Application No. 2007-325670 filed on Dec. 18, 2007; the entire contents of which are incorporated by reference herein.

TECHNICAL FIELD

The present invention relates to a non-aqueous pigment ink, and more particularly to a non-aqueous pigment ink that is suited to use within an inkjet recording system.

BACKGROUND ART

An inkjet recording system is a printing system in which printing is conducted by spraying a liquid ink with a high degree of fluidity from very fine nozzles, and adhering that ink to a recording medium such as a sheet of paper. These systems enable the printing of high-resolution, high-quality images at high speed and with minimal noise, using a comparatively inexpensive printing apparatus, and are rapidly becoming widespread.

The coloring materials for the inks used in these inkjet recording systems can be broadly classified into materials that use pigments and materials that use dyes. Of these, there is a growing tendency for the use of inks that use pigments as the coloring materials, as such inks exhibit the excellent levels of light resistance, weather resistance and water resistance that are required for high image quality printing.

In terms of the solvent, inks can be broadly classified into aqueous inks and non-aqueous inks. In an aqueous ink, because an aqueous solvent and water act as the ink medium, dispersing a pigment finely within this medium and then maintaining the stability of that dispersion is extremely difficult.

As a result, aqueous pigment inks have been proposed in which the pigment is encapsulated, thereby enabling dispersion within the aqueous medium (see Japanese Patent Laid-Open No. H09-151342 and Japanese Patent Laid-Open No. H11-140343). However, because the inks are water-based, the problem of poor water resistance is undeniable.

In contrast, non-aqueous inks that do not use water as the ink solvent, including solvent-based inks that use a volatile solvent as the main constituent and oil-based inks that use a non-volatile solvent as the main constituent, are now attracting considerable attention. Non-aqueous inks exhibit good drying properties to aqueous inks, and also offer excellent printability.

These non-aqueous inks typically comprise a non-aqueous solvent, a pigment, and a pigment dispersant and the like. Because the commonly used pigment dispersants are polymers, interaction or cross-linking between molecules tends to occur readily within the solvent. These interactions or cross-linking between molecules of the pigment dispersant prevent aggregation of the pigment and enhance the dispersibility, and are therefore necessary to a certain extent. However, if such interactions or cross-linking occur excessively, then if the ink is left sitting in an open system for a long period, normal discharge of the ink from the nozzles of the inkjet discharge head becomes impossible (due to factors such as an increase in the number of non-discharging nozzles or a deterioration in the flight of the ink droplets), and it is now known that these factors can cause white banding within the image or a deterioration in the image precision.

Moreover, particularly in those cases where the printer is left standing in a high-humidity high-temperature environment, it has been found that even if the nozzle portions are subjected to a cleaning operation that includes pushing out and wiping off the ink, some nozzles are not restored (do not return to their normal discharge state).

SUMMARY OF THE INVENTION

Accordingly, an object of the present invention is to provide a non-aqueous pigment ink that is stable upon storage for a long period in an open system, is also stable upon storage in an open system within a high-humidity high-temperature environment, and exhibits excellent discharge stability when used in an inkjet recording system.

A first aspect of the present invention provides a non-aqueous pigment ink comprising a pigment, a pigment dispersant and a non-aqueous solvent, wherein the pigment dispersant is an acrylic polymer comprising, as constituent monomers, (M1) an alkyl(meth)acrylate having an alkyl group of 12 or more carbon atoms, (M2) a (meth)acrylic acid derivative having an amino group, and (M3) a (meth)acrylic acid derivative having a glycidyl group, the combination of all the constituent monomers comprises from 7 to 15 mol % of the monomer (M2) and from 0.5 to 3 mol % of the monomer (M3), and the molar ratio (M2)/(M3) between the monomer (M2) and the monomer (M3) is within a range from 4 to 20.

A second aspect of the present invention provides a printed item printed using the non-aqueous pigment ink according to the aspect of the present invention described above.

A third aspect of the present invention provides a pigment dispersant for a non-aqueous pigment ink composed of an acrylic polymer comprising, as constituent monomers, (M1) an alkyl(meth)acrylate having an alkyl group of 12 or more carbon atoms, (M2) a (meth)acrylic acid derivative having an amino group, and (M3) a (meth)acrylic acid derivative having a glycidyl group, wherein the combination of all the constituent monomers comprises from 7 to 15 mol % of the monomer (M2) and from 0.5 to 3 mol % of the monomer (M3), and the molar ratio (M2)/(M3) between the monomer (M2) and the monomer (M3) is within a range from 4 to 20.

DESCRIPTION OF THE EMBODIMENTS

A non-aqueous pigment ink according to the present invention (hereafter also referred to as simply "the ink") uses, as a pigment dispersant, an acrylic polymer comprising a plurality of specific (meth)acrylic acid derivatives (M1) to (M3) as constituent monomers. In other words, this acrylic polymer comprises long-chain alkyl groups of 12 or more carbon atoms, amino groups and glycidyl groups, and the quantities of the amino groups and glycidyl groups are controlled. As a result, a non-aqueous pigment ink can be realized in which both the degree of interaction and the cross-linking density between molecules of the acrylic polymer that acts as the pigment dispersant can be controlled within suitable ranges, the storage stability of the ink is favorable, even in an open system and even within a high-humidity high-temperature environment, and the discharge stability of the ink when used within an inkjet recording system is excellent.

The ink according to the present invention comprises, as essential components, a pigment, a pigment dispersant, and a non-aqueous solvent.

Examples of pigments that can be used include organic pigments such as azo-based pigments, phthalocyanine-based pigments, dye-based pigments, condensed polycyclic pigments, nitro-based pigments and nitroso-based pigments (such as brilliant carmine 6B, lake red C, Watchung red, disazo yellow, Hansa yellow, phthalocyanine blue, phthalocyanine green, alkali blue, and aniline black); inorganic pigments, including metals such as cobalt, iron, chrome, copper, zinc, lead, titanium, vanadium, manganese and nickel, as well as metal oxides and sulfides, and yellow ocher, ultramarine and iron blue pigments; and carbon blacks such as furnace carbon black, lamp black, acetylene black and channel black. These pigments may be used either alone, or in combinations of two or more different pigments.

From the viewpoint of ensuring favorable dispersibility and storage stability, the average particle size of the pigment is preferably not greater than 300 nm, is even more preferably not greater than 150 nm, and is most preferably 100 nm or smaller. In this description, the average particle size of the pigment refers to the value measured using a dynamic light-scattering particle size distribution measurement apparatus LB-500 manufactured by Horiba, Ltd.

The quantity of the pigment within the ink is typically within a range from 0.01 to 20% by weight, and from the viewpoints of print density and ink viscosity, is preferably within a range from 1 to 15% by weight, and even more preferably from 5 to 10% by weight.

The pigment dispersant (hereafter also referred to as simply "the dispersant") is an acrylic polymer comprising, as monomers, (M1) an alkyl(meth)acrylate having an alkyl group of 12 or more carbon atoms, (M2) a (meth)acrylic acid derivative having an amino group, and (M3) a (meth)acrylic acid derivative having a glycidyl group. Here, the meaning of the term "(meth)acrylate" includes both acrylate and methacrylate, and the meaning of the term "(meth)acrylic acid derivative" includes both acrylic acid derivative and methacrylic acid derivative.

Examples of the alkyl group of 12 or more carbon atoms contained within the monomer (M1) include a dodecyl group, tridecyl group, tetradecyl group, pentadecyl group, hexadecyl group, heptadecyl group, octadecyl group, nonadecyl group, eicosanyl group, heneicosanyl group or docosanyl group. This alkyl chain at the ester portion may be either a straight chain or a branched chain.

Specific examples of the monomer (M1) include straight-chain alkyl(meth)acrylates such as dodecyl(meth)acrylate, docosyl(meth)acrylate, cetyl(meth)acrylate and stearyl(meth)acrylate, and branched-chain (meth)acrylates such as isostearyl(meth)acrylate. These monomers may be used either alone, or in combinations of two or more different monomers. Of the various monomers, from the viewpoint of achieving both a reduction in the ink freezing point and a reduction in the viscosity of the pigment dispersion (the dispersion comprising the pigment, the pigment dispersant and a diluting solvent), the use of dodecyl(meth)acrylate(lauryl (meth)acrylate) and/or docosyl(meth)acrylate(behenyl (meth)acrylate) is preferred, and using a combination of these two monomers is even more desirable.

Including the monomer (M1) having an alkyl chain length of 12 or more carbon atoms means that the ink can be used to provide a printed item of high print density. From the viewpoints of ensuring favorable storage stability for the ink and maintaining favorable print density when printing to plain paper, the proportion of the monomer (M1) within the combination of all the constituent monomers is preferably within a range from 82 to 92.5 mol %, and even more preferably from 86 to 92 mol %.

Alkyl(meth)acrylates having an alkyl chain length of less than 12 carbon atoms may also be used in limited quantities, and examples of preferred compounds include branched-chain (meth)acrylates such as 2-ethylhexyl(meth)acrylate, isooctyl(meth)acrylate and tert-octyl(meth)acrylate. These compounds may be used either alone, or in combinations of two or more different compounds.

Comparatively short-chain alkyl(meth)acrylates such as methyl(meth)acrylate, ethyl(meth)acrylate, butyl(meth)acrylate and octyl(meth)acrylate may also used, but the resulting polymer tends to be prone to precipitation if these monomers undergo polymerization within a non-aqueous solvent, and these monomers also exhibit a strong odor and strong skin irritancy, and therefore in those cases where these compounds are required, the quantity used should be restricted to the smallest quantity possible.

In terms of the (meth)acrylic acid derivative having an amino group (M2), the use of a (meth)acrylic acid having a tertiary amino group is preferred. The amino group is preferable as it is a functional group that exhibits strong adsorption of the pigment, and tertiary amino groups are preferred as they exist stably within solvents. From the viewpoint of facilitating the approach to the pigment, this tertiary amino group substituent is preferably a group that is not too sterically bulky.

For this reason, specific examples of compounds that can be used favorably as the monomer (M2) include dimethylaminoethyl(meth)acrylate, diethylaminoethyl(meth)acrylate, dimethylaminopropyl methacrylamide and dipropylaminoethyl(meth)acrylamide, each of which may be used alone or in combinations containing a plurality of compounds.

From the viewpoints of avoiding increases in the ink viscosity over time and ensuring favorable dispersion stability for the pigment (favorable storage stability for the ink), the proportion of the monomer (M2) within the combination of all the constituent monomers is preferably within a range from 7 to 15 mol %, and even more preferably from 7 to 12 mol %.

Examples of compounds that can be used favorably as the (meth)acrylic acid derivative having a glycidyl group (M3) include glycidyl(meth)acrylate and 2-methylglycidyl(meth)acrylate. These compounds may be used either alone, or in combinations containing a plurality of different compounds.

From the viewpoints of ensuring the long-term storage stability of the ink and enabling favorable restoration of the head discharge properties following standing within a high-humidity high-temperature environment, the proportion of the monomer (M3) within the combination of all the constituent monomers is preferably within a range from 0.5 to 3 mol %, and even more preferably from 0.5 to 2 mol %. Although only supposition, it is thought that the action of the amino group causes a ring-opening of the glycidyl group to generate a hydroxyl group, and that this hydroxyl group then reacts with a glycidyl group to generate intermolecular cross-linking. Accordingly, it is thought that by controlling the quantity of these hydroxyl groups, the cross-linking density between molecules of the pigment dispersant can be lowered, and as a result, any increase in the viscosity of the ink or precipitation of solid matter in the vicinity of the nozzles can be avoided, discharge faults can be reduced, and the head discharge properties can be favorably restored.

Moreover, although only supposition, it is thought that molecules of the pigment dispersant undergo cross-linking and exist in an arrangement that encapsulates the pigment adsorbed to the dispersant, and that as a result, desorption of the pigment from the dispersant is less likely to occur, thus enhancing the dispersibility of the pigment. At the same time, it is thought that because the dispersion efficiency of the dispersant is improved, the quantity used of the dispersant can be kept at a suitable level, meaning adverse effects caused by the existence of an excess of the dispersant can be avoided.

In addition, it is surmised that because the pigment dispersant comprises amino groups and glycidyl groups, the dispersant itself is a compound of high polarity, and because this compound encapsulates the pigment, the solvent release properties for the pigment relative to the non-aqueous solvent are enhanced, meaning printed items of high print density can be obtained, and show-through of the ink to the underside of the printed item can be prevented.

The molar ratio (M2)/(M3) between the (meth)acrylic acid derivative having an amino group (M2) and the (meth)acrylic acid derivative having a glycidyl group (M3) is preferably within a range from 4 to 20, and is even more preferably from 4 to 14. As described above, the amino group and the glycidyl group are functional groups that undergo a mutual reaction or interaction, and by using from 4 to 20 times as many amino groups as glycidyl groups, a combination of favorable restoration of the head discharge properties following standing in a high-humidity high-temperature environment and favorable long-term storage stability can be achieved.

Besides the above monomers (M1) to (M3), the acrylic polymer that functions as the pigment dispersant may also include limited quantities of other monomers capable of copolymerization with these monomers. Examples of these other monomers include (meth)acrylic acid, styrene, α-methylstyrene, maleate esters, fumarate esters, acrylonitrile, methacrylonitrile, vinyl acetate, α-olefins, N-methylpyrrolidone and styrene macromonomers. These monomers may be used either alone, or in combinations of two or more different monomers.

From the viewpoint of ensuring favorable ink discharge properties, the molecular weight (weight average molecular weight) of the acrylic polymer is preferably within a range from approximately 15,000 to 35,000, and is even more preferably from approximately 20,000 to 30,000.

The monomers described above can be polymerized using a conventional radical copolymerization method. The reaction is preferably conducted as either a solution polymerization or a dispersion polymerization.

In order to ensure that the molecular weight of the acrylic polymer following polymerization falls within the preferred range described above, the use of a chain transfer agent during polymerization is effective. Examples of compounds that can be used as this chain transfer agent include thiols such as n-butyl mercaptan, lauryl mercaptan, stearyl mercaptan and cyclohexyl mercaptan.

Examples of polymerization initiators that may be used include conventional heat polymerization initiators, including azo compounds such as AIBN (azobisisobutyronitrile), and peroxides such as t-butyl peroxybenzoate and t-butylperoxy-2-ethylhexanoate (Perbutyl O, manufactured by NOF Corporation).

Petroleum-based solvents (such as aroma-free (AF) solvents) and the like can be used as the polymerization solvent used in the solution polymerization. This polymerization solvent is preferably one or more solvents selected from amongst those solvents that can be used, as is, for the non-aqueous solvent for the product ink.

The polymerization temperature is preferably not too high in order to prevent ring-opening of the glycidyl group within the monomer (M3) during the polymerization, and conducting the polymerization at a temperature of 65° C. or lower is preferred. For this reason, the use of 2,2'-azobis(2,4-dimethylvaleronitrile) (V-65, manufactured by Wako Pure Chemical Industries, Ltd.), which functions as an oil-soluble, low temperature, azo-based polymerization initiator, is particularly suitable. Photopolymerization initiators that generate radicals upon irradiation with an active energy beam can also be used.

During the polymerization reaction, other typically employed polymerization inhibitors, polymerization accelerators and dispersants and the like may also be added to the reaction system.

From the viewpoint of pigment dispersibility, the blend quantity of the pigment dispersant within the ink, reported as a weight ratio relative to 1 part of the pigment, is preferably within a range from approximately 0.05 to 1.0 parts, and is even more preferably from 0.1 to 0.7 parts.

Relative to the total weight of the ink, the quantity of the pigment dispersant is preferably within a range from approximately 0.5 to 10% by weight, and is even more preferably from 1 to 5% by weight.

The non-aqueous solvent refers to a non-polar organic solvent or polar organic solvent for which the 50% distillation point is at least 150° C. The "50% distillation point" is measured in accordance with JIS K0066 "Test Methods for Distillation of Chemical Products" and refers to the temperature at which 50% by weight of the solvent is evaporated.

For example, examples of preferred non-polar organic solvents include aliphatic hydrocarbon solvents, alicyclic hydrocarbon solvents and aromatic hydrocarbon solvents. Specific examples of the aliphatic hydrocarbon solvents and alicyclic hydrocarbon solvents include TECLEAN N-16, TECLEAN N-20, TECLEAN N-22, Nisseki NAPHTESOL L, Nisseki NAPHTESOL M, Nisseki NAPHETESOL H, No. 0 SOLVENT L, No. 0 SOLVENT M, No. 0 SOLVENT H, Nisseki ISOSOL 300, Nisseki ISOSOL 400, AF-4, AF-5, AF-6 and AF-7, all manufactured by Nippon Oil Corporation; and ISOPAR G, ISOPAR H, ISOPAR L, ISOPAR M, EXXSOL D40, EXXSOL D80, EXXSOL D100, EXXSOL D130 and EXXSOL D140, all manufactured by Exxon Mobil Corporation. Specific examples of the aromatic hydrocarbon solvents include Nisseki CLEANSOL G (alkylbenzene) manufactured by Nippon Oil Corporation, and SOLVESSO 200 manufactured by Exxon Mobil Corporation.

Examples of preferred polar organic solvents include ester-based solvents, alcohol-based solvents, higher fatty acid-based solvents, ether-based solvents, and mixed solvents thereof. Specific examples include ester-based solvents such as methyl laurate, isopropyl laurate, isopropyl myristate, isopropyl palmitate, isostearyl palmitate, methyl oleate, ethyl oleate, isopropyl oleate, butyl oleate, methyl linoleate, isobutyl linoleate, ethyl linoleate, isopropyl isostearate, methyl soybean oil, isobutyl soybean oil, methyl tallate, isobutyl tallate, diisopropyl adipate, diisopropyl sebacate, diethyl sebacate, propylene glycol monocaprate, trimethylolpropane tri-2-ethylhexanoate and glyceryl tri-2-ethylhexanoate; alcohol-based solvents such as isomyristyl alcohol, isopalmityl alcohol, isostearyl alcohol and oleyl alcohol; higher fatty acid-based solvents such as isononanoic acid, isomyristic acid, hexadecanoic acid, isopalmitic acid, oleic acid and isostearic acid; and ether-based solvents such as diethylene glycol monobutyl ether, ethylene glycol monobutyl ether, propylene glycol monobutyl ether, and propylene glycol dibutyl ether.

These non-aqueous solvents may be used either alone, or in mixtures of two or more different solvents.

In addition to the components described above, the ink may also include, as required, any of the various additives typically used within the field, provided the inclusion of these additives does not impair the object of the present invention.

Specific examples of these additives include anionic surfactants, cationic surfactants, amphoteric surfactants, nonionic surfactants, or polymer-based, silicone-based or fluorine-based surfactants, which may be added to the ink as antifoaming agents or surface tension reducing agents or the like.

By adding an antioxidant, oxidation of the ink components can be prevented, enabling the storage stability of the ink to be improved. Examples of antioxidants that may be used include conventional antioxidants such as dibutylhydroxytoluene, propyl gallate, tocopherol, butylhydroxyanisole or nordihydroguaiaretic acid, and these may be used either alone, or in mixtures of two or more different antioxidants.

By adding a preservative, decomposition of the ink can be prevented, enabling the storage stability of the ink to be improved.

Moreover, by adding a polyoxyethylene alkylamine (an ethylene oxide adduct of an aliphatic amine: $C_nH_{2n+1}N[(EO)_xH][(EO)_yH]$) to the ink, the discharge stability can be further improved, and a higher level of print density can be achieved when printing to plain paper. In the above general formula, EO represents an oxyethylene group, and x and y each represent, independently, an integer of 0 or greater, provided that both are not zero.

Examples of the alkylamine within the above formula include laurylamine, stearylamine, and oleylamine. Of these, from the viewpoints of ensuring even more favorable levels of discharge stability and low-temperature storage stability, laurylamine is preferred.

In terms of achieving superior discharge stability, high print density on plain paper, and superior storage stability under low-temperature conditions, the number of mols of added ethylene oxide (the combined total of x and y in the above general formula) is preferably within a range from 2 to 8, and is even more preferably from 3 to 7.

In those cases where a polyoxyethylene alkylamine is added, from the viewpoints of achieving superior discharge stability and high print density on plain paper, the blend quantity of the polyoxyethylene alkylamine within the ink is preferably within a range from 1.0 to 5.0% by weight.

The ink can be produced by first preparing a pigment dispersion comprising the pigment, the pigment dispersant and the non-aqueous solvent, and subsequently adding additional non-aqueous solvent and any other optional components. The non-aqueous solvent (or diluting solvent) used during preparation of the pigment dispersion is preferably the same as the non-aqueous solvent incorporated within the ink, and in those cases where the dispersant is synthesized by solution polymerization in the manner described above, is preferably the same as the polymerization solvent.

The pigment dispersion comprising the pigment, the pigment dispersant and the non-aqueous solvent is preferably obtained by mixing the three components together, and dispersing the pigment using an appropriate dispersion device such as a ball mill or beads mill.

The ideal range for the ink viscosity varies depending on factors such as the diameter of the discharge head nozzles and the discharge environment, but typically for use within inkjet recording devices, at 23° C., is preferably within a range from 5 to 30 mPa·s, more preferably from 5 to 15 mPa·s, and approximately 10 mPa·s in one preferable embodiment. Here, the viscosity is measured at 23° C. by raising the shear stress from 0 Pa at a rate of 0.1 Pa/s, and refers to the measured value at 10 Pa.

A printed item according to the present invention is an item printed using the ink of the present invention described above. By using an ink according to the present invention, problems such as non-discharging nozzles and deterioration in the flight of the ink droplets can be prevented, and a sharp image with no white banding can be obtained, even when printing is conducted using an inkjet recording system. Moreover, by using a pigment dispersant according to the present invention, the pigment is less likely to penetrate into the interior of the printing paper, and accumulates more readily on the paper surface, meaning an image with a high print density can be obtained.

Although there are no particular restrictions on the printing method, conducting the printing using an inkjet recording apparatus is preferred. The inkjet printer may employ any of various printing systems, including piezo systems, electrostatic systems and thermal systems. In those cases where an inkjet recording apparatus is used, the ink according to the present invention is discharged from the inkjet head based on a digital signal, and the discharged ink droplets are adhered to a recording medium.

The ink according to the present invention can be used favorably even under low-temperature conditions, and exhibits excellent discharge stability when used in an inkjet recording system.

EXAMPLES

A more detailed description of the present invention is presented below based on a series of examples, although the present invention is in no way limited by these examples.

<Synthesis of Pigment Dispersant>

In a 500 ml four-necked flask were mixed lauryl methacrylate (manufactured by NOF Corporation), behenyl methacrylate (manufactured by NOF Corporation), dimethylaminoethyl methacrylate (manufactured by Wako Pure Chemical Industries, Ltd.) and glycidyl methacrylate (manufactured by Wako Pure Chemical Industries, Ltd.), using the quantities (g) shown in Table 1. Subsequently 1.5 g of V-65 (manufactured by Wako Pure Chemical Industries, Ltd.) as a polymerization initiator, 1.2 g of stearyl mercaptan (manufactured by Wako Pure Chemical Industries, Ltd.) as a chain transfer agent and 230.9 g of AF7 (AF solvent No. 7, a naphthene-based solvent, manufactured by Nippon Oil Corporation) were added, and the resulting mixture was then reacted under reflux for 5 hours under temperature conditions of 61° C.±3° C., thereby yielding a solution (solid fraction: 30%) of a pigment dispersant A. Following reaction, a very small quantity (0.002 g) of methoquinone (p-methoxyphenol) was added as a polymerization inhibitor.

The polymer obtained by heating 10 g of the thus obtained solution of the pigment dispersant A on a hotplate at 120° C. for 5 hours weighed 2.8 g (yield: 93%), and the weight average molecular weight (determined using a GPC method and referenced against polystyrene standards) of the polymer was 20,000.

Using the constituent monomers shown in Table 1, the same method as above was used to prepare solutions of pigment dispersants B to J (all of which were AF7 solutions having a solid fraction of 30% by weight). The diethylaminoethyl methacrylate and dimethylaminopropyl methacrylamide were the products manufactured by Wako Pure Chemical Industries, Ltd.

The polymer reaction yields were all within a range from 85 to 94%.

TABLE 1

Pigment Dispersant Formulations

| Constituent monomer blend weight (g) | Molecular weight | A | B | C | D | E |
|---|---|---|---|---|---|---|
| Lauryl methacrylate | 254 | 71.3 | 70.3 | 71.2 | 70.6 | 70.4 |
| Behenyl methacrylate | 395 | 23.2 | 22.8 | 23.1 | 22.9 | 22.9 |
| Dimethylaminoethyl methacrylate | 157 | 4.5 | | | 6.0 | 6.4 |
| Diethylaminoethyl methacrylate | 185 | | 5.9 | | | |
| Dimethylaminopropyl methacrylamide | 170 | | | 4.9 | | |
| Glycidyl methacrylate | 142 | 1.0 | 1.0 | 0.8 | 0.5 | 0.3 |
| Combined weight of monomers (g) | | 100 | 100 | 100 | 100 | 100 |
| Proportion of C12 or higher alkyl (meth)acrylate (M1) within all monomers (mol %) | | 90.48 | 89.57 | 90.81 | 88.95 | 88.66 |
| Proportion of amino group-containing monomer (M2) within all monomers (mol %) | | 7.64 | 8.54 | 7.68 | 10.12 | 10.78 |
| Proportion of glycidyl group-containing monomer (M3) within all monomers (mol %) | | 1.88 | 1.89 | 1.51 | 0.93 | 0.56 |
| (M2)/(M3) molar ratio | | 4.07 | 4.53 | 5.09 | 10.85 | 19.30 |
| Polymer molecular weight | | 20000 | 25000 | 25500 | 25000 | 21000 |

| Constituent monomer blend weight (g) | Molecular weight | F | G | H | I | J |
|---|---|---|---|---|---|---|
| Lauryl methacrylate | 254 | 68.0 | 71.3 | 70.0 | 71.7 | 67.2 |
| Behenyl methacrylate | 395 | 22.1 | 23.2 | 22.7 | 23.3 | 21.8 |
| Dimethylaminoethyl methacrylate | 157 | 9.0 | 4.4 | 7.0 | 5.0 | 9.5 |
| Diethylaminoethyl methacrylate | 185 | | | | | |
| Dimethylaminopropyl methacrylamide | 170 | | | | | |
| Glycidyl methacrylate | 142 | 0.9 | 1.1 | 0.3 | | 1.5 |
| Combined weight of monomers (g) | | 100 | 100 | 100 | 100 | 100 |
| Proportion of C12 or higher alkyl (meth)acrylate (M1) within all monomers (mol %) | | 83.57 | 90.47 | 87.70 | 91.47 | 81.81 |
| Proportion of amino group-containing monomer (M2) within all monomers (mol %) | | 14.80 | 7.47 | 11.74 | 8.53 | 15.48 |
| Proportion of glycidyl group-containing monomer (M3) within all monomers (mol %) | | 1.64 | 2.06 | 0.56 | 0.0 | 2.70 |
| (M2)/(M3) molar ratio | | 9.04 | 3.62 | 21.10 | | 5.73 |
| Polymer molecular weight | | 21000 | 26500 | 20500 | 21000 | 22000 |

Example 1

In a 250 ml polypropylene container were mixed 45.0 g of the above solution of the pigment dispersant A, 27.0 g of a black pigment S170 (a carbon black, manufactured by Degussa AG, primary particle size: 17 nm), 31.5 g of isooctyl palmitate (manufactured by Nikko Chemicals Co., Ltd.) and 31.5 g of AF7 (as described above), 450 g of zirconia beads (diameter: 0.5 mm) were then added to the mixture, and following dispersion for 60 minutes using a rocking mill (manufactured by Seiwa Technical Lab Co., Ltd.), the zirconia beads were removed by filtration, yielding a pigment dispersion.

To 135 g of the thus obtained pigment dispersion were added, as non-aqueous solvents, 92.6 g of AF7 (as described above), 10.0 g of AF4 (AF solvent No. 4, a naphthene-based solvent, manufactured by Nippon Oil Corporation) and 62.4 g of isooctyl palmitate (as described above), and the flask contents were then filtered through 3.0 μm and 0.8 μm membrane filters to remove any contaminants or coarse particles, thereby yielding an ink of Example 1. The pigment content within the ink was 9% by weight.

Examples 2 to 6, Comparative Examples 1 to 4

Inks were prepared in the same manner as Example 1 described above, using the formulations shown in Table 2.

The viscosities of the thus obtained inks were all within a range from 9 to 12 mPa·s (these viscosity values were measured at 23° C. using a controlled stress rheometer RS75 manufactured by Haake GmbH (cone angle: 1°, diameter: 60 mm), by raising the shear stress from 0 Pa at a rate of 0.1 Pa/s, and refer to the viscosity values at 10 Pa). Moreover, all of the obtained inks had a pigment particle size that fell within the preferred range for inkjet inks.

The properties of each ink were evaluated in the manner described below. An HC5500 device (manufactured by Riso Kagaku Corporation) was used as the inkjet recording apparatus. The HC5500 is a system that uses a 300 dpi line-type inkjet head (in which the nozzles are aligned with an approximately 85 μm spacing therebetween), wherein the paper is transported in a sub-scanning direction perpendicular to the main scanning direction (the direction along which the nozzles are aligned) while printing is conducted.

<Discharge Stability>

Each ink was loaded into the inkjet recording apparatus, a printing operation was performed, and the printer was then left to stand in a stopped state for 30 minutes. The printing operation was then restarted, and inks for which absolutely no non-discharging nozzles were observed were evaluated as A, inks which occasionally suffered from non-discharging nozzles, but for which these non-discharging nozzles could be restored to a normal state by performing a typical cleaning operation (in which an operation of forcing through ink at a pressure of 10 kPa for 10 seconds was conducted 3 times) were evaluated as B, and inks for which non-discharging nozzles existed even upon performing a typical cleaning operation were evaluated as C.

<Restoration Performance upon Standing at High Humidity>

Each ink was used to fill the inkjet head, and was then left to stand for 4 weeks in an environment at a temperature of 45° C. and a humidity of 85%. Subsequently, the ink was discharged and the state of the ink discharge was evaluated. Inks for which the typical cleaning operation described above enabled all of the nozzles to discharge normally were evaluated as A, inks for which a powerful cleaning operation (in which an operation of forcing through ink at a pressure of 25 kPa for 10 seconds was conducted 3 times) enabled all of the nozzles to discharge normally were evaluated as B, and inks for which non-discharging nozzles existed even upon performing the powerful cleaning operation were evaluated as C.

<Storage Stability (70° C.)>

Each ink was placed in a sealed container and left to stand for 3 months in an atmosphere at 70° C., the variation in the viscosity of the ink was measured, and the result of that measurement was then evaluated in the manner described below.

Viscosity Variation:

[(Viscosity after 3 months×100)/(Initial viscosity value)]−100 (%)

Inks for which the viscosity variation was less than 5% were evaluated as A, inks for which the viscosity variation was at least 5% but less than 10% were evaluated as B, and inks for which the viscosity variation was at least 10% were evaluated as C. This accelerated stability test enables the long-term storage stability of the ink to be evaluated.

<Storage Stability (Room Temperature)>

Each ink was placed in a sealed container and left to stand for 4 weeks, the variation in the viscosity of the ink was measured, and the result of that measurement was then evaluated in the manner described below.

Viscosity Variation:

[(Viscosity after 4 weeks×100)/(Initial viscosity value)]−100 (%)

Inks for which the viscosity variation was less than 5% were evaluated as A, inks for which the viscosity variation was at least 5% but less than 10% were evaluated as B, and inks for which the viscosity variation was at least 10% were evaluated as C.

The above results are shown in Table 2.

TABLE 2

Ink Composition and Evaluation

|  |  |  | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|---|---|
| Ink component blend quantity | Pigment dispersant | | A | B | C | D | E | F | G | H | I | J |
| | Pigment dispersion | Pigment dispersant solution | 45.0 | 45.0 | 45.0 | 45.0 | 45.0 | 45.0 | 45.0 | 45.0 | 45.0 | 45.0 |
| | | Carbon black | 27.0 | 27.0 | 27.0 | 27.0 | 27.0 | 27.0 | 27.0 | 27.0 | 27.0 | 27.0 |
| | | Isooctyl palmitate | 31.5 | 31.5 | 31.5 | 31.5 | 31.5 | 31.5 | 31.5 | 31.5 | 31.5 | 31.5 |
| | | AF7 (naphthene-based solvent) | 31.5 | 31.5 | 31.5 | 31.5 | 31.5 | 31.5 | 31.5 | 31.5 | 31.5 | 31.5 |
| | AF7 (naphthene-based solvent) | | 92.6 | 92.6 | 90.1 | 90.1 | 92.6 | 92.6 | 90.1 | 92.6 | 93.6 | 93.6 |
| | AF4 (naphthene-based solvent) | | 10.0 | 10.0 | 12.5 | 12.5 | 10.0 | 10.0 | 12.5 | 10.0 | 9.0 | 9.0 |
| | Isooctyl palmitate | | 62.4 | 62.4 | 62.4 | 62.4 | 62.4 | 62.4 | 62.4 | 62.4 | 62.4 | 62.4 |
| Ink evaluations | Discharge stability | | A | A | A | A | A | A | B | A | A | A |
| | Restoration performance upon standing at high humidity | | B | B | A | A | A | A | C | A | C | C |
| | Storage stability (70° C.) | | A | A | A | A | B | B | A | C | C | C |
| | Storage stability (room temperature) | | A | A | A | A | A | A | A | A | A | C |

It is to be noted that, besides those already mentioned above, many modifications and variations of the above embodiments may be made without departing from the novel and advantageous features of the present invention. Accordingly, all such modifications and variations are intended to be included within the scope of the appended claims.

The invention claimed is:

1. A non-aqueous pigment ink comprising a pigment, a pigment dispersant and a non-aqueous solvent, wherein
   the pigment dispersant is an acrylic polymer comprising, as constituent monomers:
   (M1) two or more alkyl (meth)acrylates having an alkyl group of 12 or more carbon atoms,
   (M2) a (meth)acrylic acid derivative having an amino group, and
   (M3) a (meth)acrylic acid derivative having a glycidyl group,
   wherein monomer (M2) is contained in an amount of from 7 to 15 mol % and monomer (M3) is contained in an amount of from 0.5 to 3 mol % based on the total combination of all constituent monomers, and a molar ratio (M2)/(M3) is between 4 to 20.

2. The non-aqueous pigmented ink according to claim 1, wherein the acrylic polymer comprises from 82 to 92.5 mol % of the monomer (M1).

3. The non-aqueous pigmented ink according to claim 1, wherein the (meth)acrylic acid derivative having an amino group (M2) comprises a (meth)acrylic acid derivative having a tertiary amino group.

* * * * *

UNITED STATES PATENT AND TRADEMARK OFFICE
CERTIFICATE OF CORRECTION

PATENT NO. : 8,642,695 B2  
APPLICATION NO. : 12/314429  
DATED : February 4, 2014  
INVENTOR(S) : Uozumi et al.

Page 1 of 1

It is certified that error appears in the above-identified patent and that said Letters Patent is hereby corrected as shown below:

In the Claims

Claim 1, Column 12, Line 57

Delete "4 to 20" and insert --4 and 20--

Signed and Sealed this
Sixteenth Day of September, 2014

Michelle K. Lee
*Deputy Director of the United States Patent and Trademark Office*